Aug. 4, 1959     C. M. PETERS ET AL     2,897,836
BALANCED VALVE

Filed June 13, 1956     3 Sheets-Sheet 1

CLIFFORD M. PETERS
ROBERT W. DINNING
INVENTORS

BY *Browning, Simms & Hyer*

ATTORNEY

CLIFFORD M. PETERS
ROBERT W. DINNING
INVENTORS

CLIFFORD M. PETERS
ROBERT W. DINNING
INVENTORS

ATTORNEY

United States Patent Office 2,897,836
Patented Aug. 4, 1959

2,897,836

BALANCED VALVE

Clifford M. Peters and Robert W. Dinning, Longview, Tex., assignors to U.S. Industries, Inc., New York, N.Y., a corporation of Delaware Application June 13, 1956, Serial No. 591,077

11 Claims. (Cl. 137—454.5)

This invention relates to valves and more particularly to valves which are substantially balanced in both open and closed position so that a relatively light motor may control opening and closing of a valve handling high pressure fluid.

Valves heretofore used for automatic flow control service for oil field gathering systems under high pressure, such as block valves and dump valves, have employed fluid motors for shifting the valve member between open and closed position. Due to the forces involved, the fluid operated diaphragm motors, which are customarily used for such valves, have been very large to permit their operation by low pressure fluid.

It has been known that a part of the pressure on the valve member could be balanced by providing a balancing piston exposed on one side to the pressure on one side of the valve member in such way that pressure on the piston and valve member work in opposition to and balance each other when the valve is closed. However, once the valve is opened, this pressure balance is destroyed by the surfaces of the valve member and balancing piston which were exposed to the same pressure being exposed to different pressures.

It is an object of this invention to provide a valve which is substantially balanced in both the open and closed position so that only a small force is necessary to open or close the valve.

Another object is to provide a small, light, motor valve for handling high pressure fluid which may be controlled by fluid pressure in the normal instrument range.

Another object is to provide such a valve which may be designed to be fluid motor opened or fluid motor closed.

Another object is to provide a balance motor valve in which the parts susceptible to wear are easily replaced without removing the valve body from the line it controls.

Another object is to provide a motor valve in which upstream and downstream pressure on the valve member when closed is fully balanced and is unbalanced only by the action of upstream pressure over the area of a rod connecting the motor to the valve member when the valve is open.

Another object is to provide a balanced valve in which the surfaces exposed to a common pressure to balance the valve when closed are also exposed to a common pressure when the valve is open.

Another object is to provide a three-way valve which is substantially balanced in all positions of the valve member for seal off and flow through at least one of the outlets.

Another object is to provide a valve in which there is little effective area on the valve member exposed to upstream pressure when the valve is closed, and in which the effect of downstream pressure on the valve member when seated is substantially balanced out and the effect of all pressure on the valve member when unseated is substantially balanced out.

Other objects, features and advantages of the invention will be apparent from the drawing, the specification and the claims.

In the drawings wherein there is shown by way of illustration several embodiments of the invention:

In carrying out this invention, a valve is provided with a balancing member exposed to pressure on one or both sides of the valve seat when the valve is closed to balance out at least in part the pressure on the valve member. In order that the balanced condition also exist after the valve has been opened, a restriction is provided in the passageway through the valve downstream of the valve seat of smaller size than the passageway through the valve seat with the valve member unseated. In this way, upstream pressure will be effective on the surfaces of the valve member and balancing member which were exposed to downstream pressure with the valve closed and the valve will remain substantially balanced in both open and closed condition.

Figure 1:
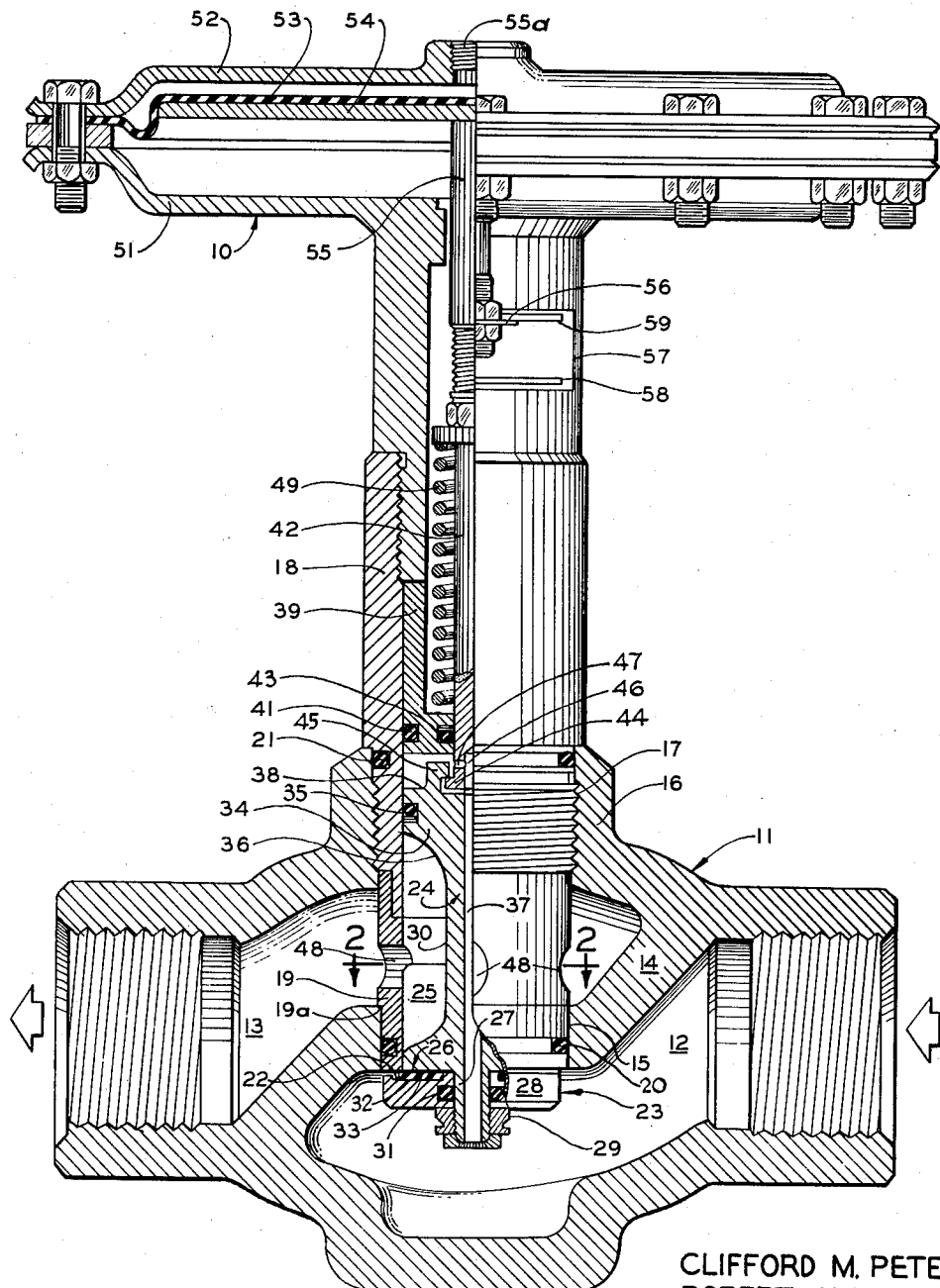
Fig. 1 is a view partly in elevation and partly in vertical cross-section through a valve constructed in accordance with this invention.

Referring now to Fig. 1 of the drawings, a preferred form of valve which is biased toward closed position and opened by fluid pressure on the motor indicated generally at 10 is shown. The valve proper includes a body indicated generally at 11 which has a flow passageway therethrough provided by an inlet 12 and an outlet 13. The flow passageway may terminate in any desired type of end fittings such as the female threaded fittings shown. The valve body is provided with a partition 14 extending across the flow passageway through the body and dividing the passageway into upstream and downstream portions. An annular opening 15 through the partition receives the valve seat and valve member assembly as will appear below. A boss 16 having a threaded side door opening 17 therein in line with opening 15 communicates with the downstream portion 13 of the passageway through the body.

The valve seat and valve member assembly including the balancing means are assembled as a unit and inserted through boss 16 into the body 11. The invention may be practiced with many different forms of seat and valve members. In fact, a number of forms have been used which employed this invention. The form illustrated is preferred as it is a trouble free structure which will provide a bubble tight seat. The seat assembly includes a two piece sleeve provided by an outer sleeve portion 18 and a seat sleeve portion 19, the former being threadedly secured to boss 16 with the seat sleeve received in annular bore 15 in the partition 14. Seat sleeve 19 has an annular shoulder 19a which abuts partition 14 as the outer sleeve is made up in side door opening 17. A seal is provided between the seat sleeve and partition as by an O-ring 20 to prevent passage of fluid therebetween. A seal is also provided between the outer sleeve 18 and boss 16 as by O-ring 21 to prevent loss of fluid between these parts. The lower end face 22 of seat sleeve 19 provides a valve seat.

A valve member indicated generally at 23 cooperates with seat 22 to control flow through the valve. The valve member is provided by one end of a piston like element 24 having a sliding fit with the inner wall of seat sleeve 19. The lower end of piston 24 terminates in an end face 26 and a reduced diameter portion 27 extending beyond face 26. The lower end of piston 24 adjacent end face 26 has a close sliding fit with the inner wall of seat sleeve 19 when the valve member is in seated position. A cap 28 is received about reduced diameter extension 27 and held thereon by a nut 29. An O-ring 31 seals between the cap and piston member 24. The surface of cap 28 which confronts end 26 of piston 24 has an annular recess 32 which extends radially across the crack between seat sleeve 19 and piston member 24. An annular ring of resilient seal material 33 is carried within recess 32. The resilient material is clamped between the end face 26 of piston member 24 and cap 28. The seal material 33 extends radially outwardly to underlie or bridge the crack between the inner periphery of seat sleeve 19 and the outer periphery of piston member 24 to form a seal therebetween when the valve is closed. The gasket like seal member 33 does not completely fill recess 32 so that as the valve member is closed the radially outermost part of cap 28 will move into metal-to-metal abutment with seat 22. When the valve is closed, the seal member 33 is compressed slightly. This will permit a pressure energized seal to be formed across the seal member 33 to form a bubble tight seal between the valve member and seat.

The valve member 23 moves downwardly to open. Piston member 24 has a reduced diameter center section 30 to permit flow through the seat when the valve is open. A plurality of guides 25 extend radially from the lower end of piston member 24 and slidingly engage the seat sleeve 19 as the valve opens and closes to guide the piston 24.

In order to balance at least in part the pressure acting on the valve member, a pressure responsive member is provided which is exposed to one or more of the pressures acting on the valve member. The balancing member is dimensioned and arranged so that these pressures act on the pressure responsive member and the valve member in opposition so as to substantially balance out the effect of pressure on the valve member. The pressure responsive member is preferably provided by a piston 34 formed on the upper end of member 24 and having a sliding seal with the inner periphery of outer sleeve 18 such as provided by O-ring 35. The pressure responsive member or piston 34 is provided with one pressure face exposed to downstream pressure and arranged to urge the valve member toward closed position under such pressure. This surface can be provided by the underside 36 of piston 34 and will balance out at least in part the effect of downstream pressure on the valve member 23.

The other side of the pressure responsive member can be exposed to pressure on the other side of the valve member. In the Fig. 1 embodiment, pressure on the other side of the valve member is upstream pressure and therefore it is desired to provide for communication between the top side of piston 34 and the upstream passageway 12. Such communication may conveniently be provided by a passageway 37 extending axially through piston member 24. Passageway 37 conducts upstream pressure to the upper face 38 of pressure responsive member 34 whence it acts on the pressure responsive member in a direction to oppose the effect of upstream pressure on the valve member and to cancel out at least in part the effect of such pressure.

Upper sleeve 18 is provided with a closure 39 above the throw of piston member 34 to seal off sleeve 18, the seal being provided by an O-ring 41. Closure 39 confines pressure acting on the pressure face 38 of the piston 34.

In order to connect the fluid motor 10 to the valve member, a rod 42 extends through closure 39. The connection could be provided by a connection which would not have to be moved into the body against pressure, but the structure illustrated is preferred for its simplicity and trouble free service. A sliding seal can be provided between the rod and closure in any convenient manner such as by O-ring 43. Rod 42 can be connected to piston member 24 in any convenient manner such as by the interlocking flanges 44 and 45 as shown. The flange 45 is provided by a radially extending undercut slot in the top of piston member 44 into which the rod 42 is moved laterally before the parts are assembled in the sleeve. Once it is assembled, the rod is held within the slot providing flange 45. To insure that pressure freely reaches upper surface 38 of balancing piston 34 the lower end of rod 42 is provided with a passageway 46 which communicates with passageway 37 in the piston member. A lateral port 47 connects the passageway 46 with the exterior of rod 42 below seal 43.

Upon unseating of the valve, it is desired that pressure across the balancing piston and valve member be balanced out leaving only the unbalance of pressure acting on the rod 42. This is accomplished by providing for a first pressure to be effective on the opposite pressure surfaces of the balancing piston and valve member, and for a second pressure to be effective on adjacent surfaces of the balancing piston and valve member. In this embodiment, the first and second pressures are the same, as upstream pressure is maintained on all surfaces of piston member 24 when the valve is open and the piston member 24 is completely balanced. For this purpose, the downstream passageway through the valve is restricted to provide a passageway of less cross-sectional area than the passageway through the valve seat when the valve is open to maintain upstream pressure in the passageway upstream of the restriction.

The downstream restriction also sizes the valve and as the pressure drop is taken across this restriction, it protects the valve seat against cutting. Preferably, the arrangement is such that the restricting member can be replaced when worn or when it is desired to change the capacity rating of the valve, without moving the valve from the line thus permitting the valve member to be permanently made up in a flow line. For these reasons, the restriction is preferably provided by one or more radial holes 48 in seat sleeve member 19. Thus, by removing the valve seat and valve member assembly through side door 17, either sleeve may be easily replaced if worn. If desired, a sleeve having different size outlets to change the capacity of the valve may be substituted. Upon unseating of valve member 23, the pressure within the huddling chamber provided by sleeves 18 and 19 and upstream of the restricted outlets 48 will immediately increase to upstream pressure and upstream pressure will be effective across both the valve member and balancing piston.

To insure that the valve will return to closed position, under low pressure conditions, a resilient member such as spring 49 may be provided to urge the rod 42 toward valve closing position.

From the foregoing it will be apparent that downstream pressure acts on the top of valve member 23 and on the bottom of piston 34. Upstream pressure acts on the upstream side of valve member 23 and on the top surface 38 of piston 34 and on the end of rod 42. Thus, it is apparent that if the valve is completely balanced when in closed position, then when the valve member is unseated it will be unbalanced by the value of upstream pressure acting over the cross-sectional area of rod 42 at seal 43. On the other hand, if the valve is to be completely balanced when unseated, then it must be unbalanced by the same area when completely seated. The unbalance could be divided between the seated and unseated positions if desired. It is preferred to have the valve completely balanced when seated and slightly unbalanced when unseated. By providing the unbalance when the valve is open the valve member will not tend to snap to fully open position upon being cracked from its seat as a greater force will be necessary to move the valve to open position than to crack it from its seat. This will prevent any tendency of the valve to hammer.

In order to provide the desired relative areas between the balancing piston 34 and valve member 23, the internal bore of upper sleeve 18 in which piston 34 reciprocates is equal in cross-sectional area to the sum of the cross-sectional area of rod 42 and the effective area of valve member 23 exposed to upstream pressure when seated. This will provide complete balance when the valve is seated.

The motor 10 for operating the valve member may take any desired form, with the diaphragm motor shown being preferred. A fluid operated motor is preferred to permit operation of the valve by gas under pressure available in the field when the valves are used for tank switching or the like in petroleum field gathering systems. The motor includes a body 51 threadedly connected to the upper sleeve 18, a cover plate 52, and a diaphragm 53 bolted between the body 51 and cover plate 52. Back-up member 54 underneath the diaphragm carries a plunger 55 which abuts the upper end of rod 42 to move the rod toward valve opening position upon downward movement of diaphragm 53. The force of spring 49 returns the diaphragm to its rest position when pressure on the diaphragm is relieved. A fitting 55 is provided through which fluid under pressure may be introduced into and removed from the space between diaphragm 53 and cover plate 52 to flex diaphragm 53.

The underside of diaphragm 53 is vented to atmosphere through a slot way, not shown. Marker 56, carried by back-up plate 54, reciprocates through the slot referred to, to indicate the position of diaphragm 53 and hence the position of valve member 23. An indicia plate 57 may be provided with markings for open and closed positions of the valve as shown at 58 and 59 respectively.

From the above, it is believed that operation of the valve is apparent. The valve as depicted in Fig. 1 is in closed position and the chamber above diaphragm 53 is not pressurized sufficient to unseat the valve member. To permit flow through the valve, low pressure fluid is introduced through fitting 55a to pressurize diaphragm 53 and move the valve to fully open position. The valve was balanced before it was moved into open position and upon being opened, the valve is unbalanced by the force exerted by upstream pressure across the cross-sectional area of rod 42 at the sliding seal 43. Thus, as pressure within the huddling chamber begins to increase, the control pressure must be increased to exert additional force to overcome this slight unbalance of the piston 24 as the valve moves toward open position. At this point, it might be noted that it is desired to size motor 10 so that it may be operated by pressure in the range of usual instrument pressure so that the motor may be controlled by conventional instruments which are constructed to handle pressure in the instrument range.

When it is desired to close the valve, release of pressure on diaphragm 53 will permit spring 49 and the upstream pressure acting on rod 42 to move the valve to closed position. When closed, the spring will exert a sufficient force on the valve member urging it toward closed position to compress gasket 33 and a pressure energized seal will be formed across the valve seat.

Figure 3:
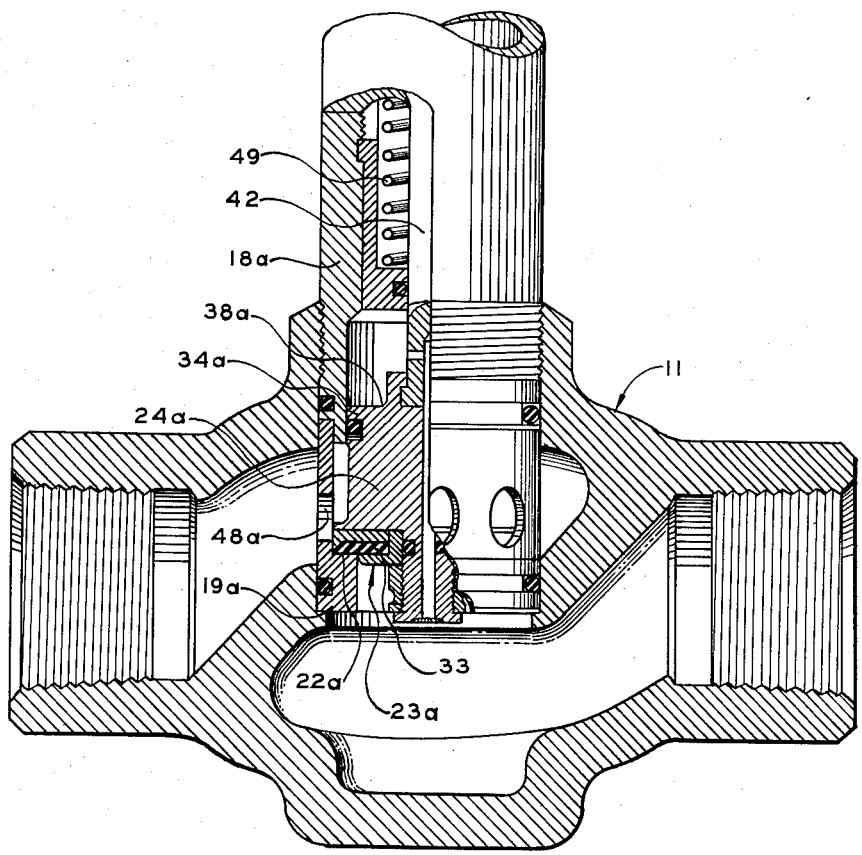
Fig. 3 is a fragmentary view partly in elevation and partly in vertical cross-section of a valve constructed in accordance with this invention, the motor for the valve being identical with that shown in Fig. 1 and therefore omitted.
Figure 2:
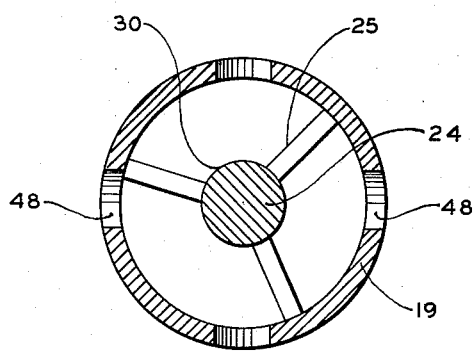
Fig. 2 is a view along the lines 2—2 of Fig. 1 in the direction of the arrows.

Referring now to Fig. 3, there is shown a form of valve employing this invention which is urged toward open position by a resilient means and is closed by a fluid motor. Fluid motor 10 is utilized with this form of the valve and is therefore omitted from the drawing. As this valve is moved toward its seat by downward movement of rod 42, the piston member 24a which carries pressure responsive member 34 and valve member 23a moves downwardly to close the valve and upwardly to open the valve. For this reason, seat valve 19a has an upwardly facing annular seat portion 22a against which seal member 33 is compressed when the valve is closed to form a bubble tight seal. The seal is again completely enclosed when the valve member is seated to permit forming of a pressure energized seal.

The relationship between the pressure responsive surfaces of the valve member 23a and balancing piston 34a are the same as in the case of the valve of Fig. 1. The effective pressure area of upper surface 38a of the balancing piston is equal to the sum of the effective pressure area of the valve member exposed to upstream pressure when the valve is closed and the cross-sectional area of rod 42. The valve member moves upwardly to completely clear the passage through the valve seat and the restricting orifices 48a in seat sleeve 19a. The piston 24a need not be provided with a reduced diameter portion to provide a passageway for fluid when the valve is open and therefore there is in effect no pressure area on which downstream pressure can act when the valve member is closed.

It will also be noted that a larger number of restricted outlets 48 may be provided in this form of valve as the passageway through the valve seat is unobstructed when the valve member is open, and therefore, the valve can accommodate a greater volume of flow. However, they still restrict the passageway through the valve member downstream of the valve seat and upon opening of the valve upstream pressure will be exerted on all exposed areas of the piston member 24a and it will be completely balanced. Thus again the valve is completely balanced when closed and is unbalanced by the effect of upstream pressure acting across the area of rod 42 when the valve member is open. The valve is maintained in open position by the combined force exerted by spring 49 and the force of upstream pressure on rod 42. These forces are overcome by fluid motor 10 to seat the valve and the valve member is maintained on its seat by maintaining sufficient pressure acting on diaphragm 53 of motor 10.

Figure 4:
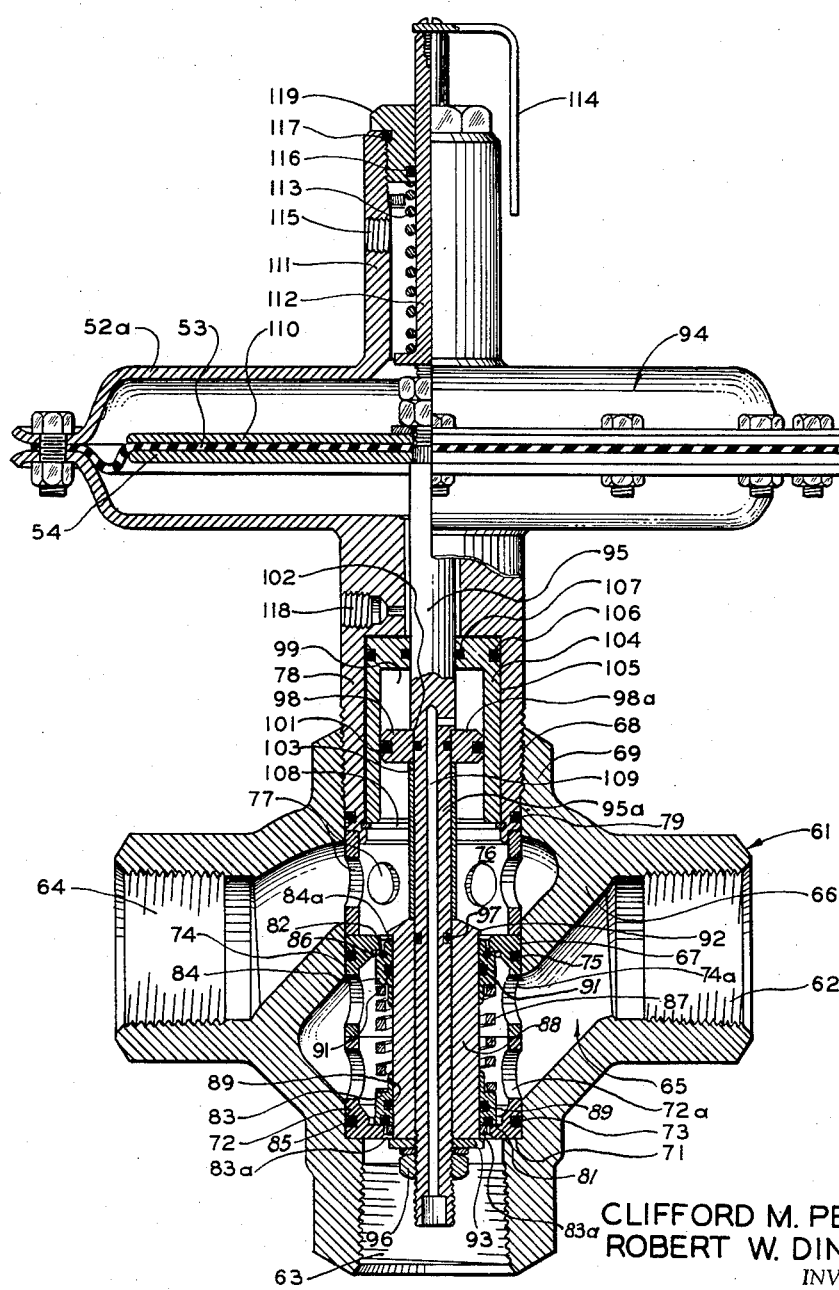
Fig. 4 is a view partly in vertical elevation and partly in vertical cross-section through a three-way valve constructed in accordance with this invention.

The valve shown in Fig. 4 is somewhat different in construction from the previously discussed motor valves in that a sleeve type of valve is provided which has only a very small effective area exposed to upstream pressure when the valve is closed and therefore the effect of upstream pressure when the valve is closed need not be balanced out. Pressure on top of the pressure responsive member is the pressure at one of the outlets from the valve. The pressure relationship between open and closed position is also slightly different from the valves previously discussed, but the valve is a substantially balanced valve, which may be operated by pressure fluid in the instrument range.

Valve body 61 has a flow passageway therethrough which branches into two outlets provided by inlet 62, outlets 63 and 64, and a central valve chamber area indicated generally at 65 in communication with the inlet and two outlets. A partition 66 extends across the valve chamber 65 and isolates inlet 62 and port or outlet 63 from outlet 64 with the exception of an annular opening 67 through the partition 66. Outlet 63 and the annular opening 67 are in line with each other. Also in line with these two elements is a side door opening 68 in boss 69 through which the valve seat and valve member assembly can be inserted into the valve body. The body 61 at outlet 63 is provided with a shoulder 71 against which the valve assembly is abutted when in place. In order that the valve seat and valve member assembly and parts thereof be readily removable and replaceable, the assembly again includes a plurality of sleeve members arranged in tandem. At the lower end of the assembly a lower seat sleeve 72 is landed on shoulder 71 and a seal member such as O-ring 73 seals between the seat sleeve and body 61. Immediately above the lower seat sleeve, an upper seat sleeve 74 which is identical with the lower seat sleeve except inverted in position is provided. Sleeves 72 and 74 are perforated at 72a and 74a respectively to permit flow through the sleeves. These perforations do not appreciably restrict flow through the valve. A seal such as O-ring 75 seals between the upper seat sleeve and the partition 66. Immediately above the upper seat sleeve a perforated sleeve member 76 is provided having perforations 77 therein whose combined cross-sectional area is less than the area of the flow passageway through the seat provided by upper seat sleeve 74 when the valve member is open to production through outlet 64. This arrangement will permit the valve to be balanced in substantially the same manner as the valves previously discussed. An upper sleeve 78 which forms the lower end of the fluid motor for operating the valve and which carries the pressure responsive member is positioned immediately above the perforated sleeve and has a threaded connection with side door 68 to hold the several sleeves therebelow in position. A seal such as provided by O-ring 79 seals between the upper sleeve and body 61.

Desirably, the seal between the valve member and the two valve seats is formed by a soft seat material to provide a bubble tight seal. The arrangement between the valve seats and valve member is such that a seal may be provided across two valve seats simultaneously so that the valve may be closed off completely. Analogous to the previously discussed valves, each of the valve seats 72 and 74 is provided with seat surfaces 81 and 82 against which a seal is perfected by the valve member. These seat surfaces confront each other and portions of the valve member provided by annular rings 83 and 84 abut the seal surfaces 82 and 83. Soft seal elements such as O-rings 85 and 86 are carried by the rings 83 and 84 respectively to engage the seats and form seals therewith. To prevent extrusion of the soft seal material by the pressure being sealed against as the rings move into sealing position, the rings are provided with annular reduced diameter portions 84a and 83a which lead the annular rings as they move into seated position and have close sliding fits with the bore through the seats with which they cooperate. This provides an enclosure for the seal material and prevents it from being extruded under pressure.

In order that the two annular rings engage and seal with their respective seats simultaneosuly, a compression spring 87 is interposed between the rings and urges them away from each other and into engagement with the seats.

As above mentioned, it is desirable to hold to a minimum the effective area of the valve members exposed to inlet pressure and for this reason the annular rings 83 and 84 are carried by a sleeve 88 which is only slightly smaller in diameter than the diameter of the passageways through each of valve seats 72 and 74. The sleeve 88 is cylindrical in form and has a constant diameter outer wall. The sleeve extends completely through the two annular seat elements 72 and 74 in all positions of the valve member. Therefore, the sleeve has no area exposed to upstream pressure when the valve is closed. The only effective area of the valve member exposed to upstream pressure when the valve is closed is effective on the rings 83 and 84 and is defined by the area of the annulus between the wall of the bore through the seat members and the exterior wall of sleeve 88.

A seal is provided between each of the annular rings 83 and 84, and sleeve 88 in any desired manner such as by O-rings 89 and 91.

The annular rings are reciprocated by sleeve 88 to open either of the valves and for this purpose a shoulder 92 is provided on the sleeve 88 on the downstream side of annular ring 84 and a washer 93 is provided on the downstream side of ring 83. The shoulder and ring engage the downstream ends of the annular rings and move the rings away from the seats with reciprocation of sleeve element 88.

The sleeve element 88 is connected to the fluid motor indicated generally at 94 by a connecting rod 95. The rod 95 passes through the sleeve 88 and washer 93 and the sleeve is secured to the rod by a nut 96 made-up on the threaded end of rod 95. A suitable seal can be provided between the rod and sleeve 88 by any desired means such as O-ring 97.

Downstream pressure on the valve member is balanced by the provision of a pressure responsive member such as balancing piston 98 carried by connecting rod 95 and reciprocal within cylindrical bore 99. A suitable seal is provided between the piston 98 and bore 99 in any desired manner such as by an O-ring 101. It will be noted that connecting rod 95 has a reduced diameter portion 95a which commences above piston 98 and extends to the free end of the connecting rod. This provides a shoulder 102 against which the balancing piston 98 abuts and a spacing sleeve 103 extends between piston 98 and the valve sleeve element 88. Thus, when nut 96 is made-up on the connecting rod, it holds the balancing piston and sleeve in position on the connecting rod 95. This type of construction is preferred as it permits interchange of piston 98 with other pistons to provide a smaller or larger balancing piston if desired.

To permit the interchange of the balancing piston with a piston of different size, the cylindrical bore in which the piston reciprocates is provided by an annular insert 104 which is carried in bore 105 in the upper sleeve 78. Suitable seals are provided between the insert member and the upper sleeve and the connecting rod by O-rings 106 and 107 respectively. The insert is held within the bore in the upper sleeve by a split ring 108. When the piston is interchanged with a piston of different size, an insert having a suitable wall thickness to provide a cylindrical bore with which the different size piston can be used is substantially for the insert 105.

Fluid communication between the upper face 98a of the piston and the outlet 63 is provided by a passageway 109 which extends through the rod 95 and opens into the fluid chamber above the balancing piston 98 and into the outlet 63.

The preferred balance of the three-way valve is provided by forming the cylindrical bore 99 for the balancing piston with a diameter equal to the diameter of the bore through each of the valve seats 72 and 74. With this relationship, downstream pressure in both outlets 63 and 64 is substantially balanced out and has little effect on the valve member when the valve is closed. When the valve is open to flow through one outlet, pressure in the other outlet will have little effect on the valve member. Upstream pressure tends to hold the two annular members 83 and 84 on their seats as it acts on an effective area equal to the annulus between the valve seats and the sleeve member 88. The ring members 83 and 84 are also urged toward their seats by spring 87 and therefore will remain seated even under no pressure conditions.

The fluid motor for operating the valve is again preferably a diaphragm motor, but in this case the motor is operated by pressure on both sides of the diaphragm. The construction of the diaphragm motor is slightly different in that the diaphragm 53 is provided with both a lower back-up member 54 and an upper back-up member 110. The closure plate 52a for the diaphragm has an upstanding tubular housing 111 in which a rod 112 is mounted for reciprocation. The rod is urged toward abutment with the upper end of connecting rod 95 by a spring 113. The rod is provided with an outside arm 114 which moves with the diaphragm to indicate whether the valve is in closed or one of its two open positions. As the tubular housing 111 also provides an inlet 115 for introducing pressure to the upper face of the diaphragm 53, suitable seal means between the tubular housing and the reciprocating rod 112 should be provided such as O-ring 116. The closure plug 119 for the tubular housing is also provided with a seal such as O-ring 117. Fluid pressure may be applied to the underside of diaphragm 53 in any desired manner such as through inlet 118.

In operation, the valve member may be reciprocated by alternately applying pressure to the two pressure faces of the diaphragm or the valve member may be controlled by using different pressure, one of sufficient magnitude to override the other.

When the valve is closed, upstream pressure holds the ring members on their seats, but does not affect sleeve 88. Downstream pressure in outlet 64 is effective on equal and opposite areas and does not tend to move the valve member. Downstream pressure in outlet 63 is effective on a larger area of the valve member than the balancing piston and tends to open the valve. Spring 87 and upstream pressure overcome this tendency.

When it is desired to open the valve for production through outlet 64, pressure is applied through inlet 115 to pressurize the upper surface of diaphragm 53 and move the connecting rod 95 downwardly. As the valve opens, upstream pressure moves into the huddling chamber provided by the perforated sleeve 76 and as the outlets 77 restrict flow through the valve, upstream pressure will be maintained in the huddling chamber and will act on the confronting faces of the valve member and balancing piston 98. As the valve member moves into the upstream side of the valve seat, upstream pressure will be exerted both on the annular sleeve 88 of the valve member and on the annular ring member 84. The effective area of the valve member exposed to upstream pressure when open will be the upper face of the annular sleeve 88. This sleeve is slightly smaller in area than the effective area of the balancing piston 98 and a slight increase in control pressure over that necessary to crack the valve from its seat will be needed to move the valve to fully open position. The upper face of piston 98 is smaller in effective area than the end of the valve member exposed to pressure in outlet 63 by the cross-sectional area of connecting rod 95. The force exerted by the diaphragm 53 must also overcome the force of pressure on the rod as well as the force of spring 87 to open the valve.

Assuming the well to be on production and well fluid to be flowing through outlet 64, the fluid can be diverted to outlet 63 by introducing a control pressure through inlet 118 to pressurize the undersurface of diaphragm 53 and also bleeding off the pressure on the upper surface of diaphragm 53. This control pressure acting through port 118 will first aid in moving the diaphragm back to its intermediate position where the annular ring 84 will seat on the upper seat sleeve 74 to close the valve to flow through outlet 64. Further increase in pressure introduced through inlet 118 causes the diaphragm to move upwardly and to open the outlet 63 to obtain a test sample.

As the connecting rod 95 moves upwardly from the intermediate position shown in the drawing, washer 93 engages the end surface of the lower annular ring 83 and lifts it from its seat. Pressure within the huddling chamber provided by perforated sleeve 76 will be exerted on equal areas of the valve member and the underside of the balancing piston and therefore will have no effect on opening of the valve to flow through outlet 63. As the valve is moved toward open position to open outlet 63, the valve member moves up into the inlet side of the valve seat 72. It will be noted that the throw of the valve between open and closed position for flow through this outlet permits the nut to move up to a point where the lower end of the nut is approximately even with the upper edge of the passageway through seat 72. Thus upstream pressure will be effected on an annular area defined by the outer periphery of the threaded end of rod 95 and the outer periphery of the sleeve element 88 of the valve member. The valve member will have an effective area exposed to upstream pressure which is slightly less than the effective area of the top surface of balancing piston 98. The top of the balancing piston is exposed to pressure downstream of seat 81 which will be lower than upstream pressure. This lower pressure will compensate for the difference in area and for the effect of downstream pressure on the lower end of stem 95, and the valve will be substantially balanced when open to flow through outlet 63. A restriction could be placed in the outlet 63 to maintain upstream pressure on the valve member and balancing piston if desired.

From the above, it will be seen that all the objects of this invention have been attained. There has been provided both a two-way and a three-way valve in which the valve member is substantially balanced in both the open and closed position so that the valve may be controlled by a fluid motor of small size utilizing pressure within the instrument range. Even though the valve member is substantially balanced, when in closed position the seal provided is such as to provide a bubble tight seal through the valve member for complete shut off. The seats are protected against cutting due to pressure drop thereacross with the exception of the seat for outlet 63. This seat could be protected by providing a downstream restriction if desired. In each of the valves, the downstream restriction is also a sizing orifice for the valve and may be readily replaced without pulling the valve from the line in which it is made-up.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve comprising, a body having a flow passageway therethrough, a valve seat across the passageway, a valve member reciprocally mounted in the passageway and cooperable with the seat controlling flow through the passageway, a pressure responsive member operably connected to the valve member and exposed on opposite sides to upstream and downstream pressure respectively when the valve is closed, said pressure responsive member having an effective area substantially equal to that of the valve member within said seat to balance out at least in part the effect of pressure on the valve member, a restriction in the passageway downstream of the valve seat of smaller size than the passageway through the valve seat when the valve is open across which substantially all of the pressure drop across the valve is taken when the valve is open, and means for reciprocating the valve member toward and away from its seat to open and close the valve, said pressure responsive member being situated between the valve member and the reciprocating means.

2. A valve comprising, a body having a flow passageway therethrough, a valve seat across the passageway, a valve member reciprocally mounted in the passageway and cooperable with the seat controlling flow through the passageway, a pressure responsive member operably connected to the valve member and exposed on opposite sides to upstream and downstream pressure respectively when the valve is closed, said pressure responsive member having an effective area substantially equal to that of the valve member within said seat to balance out at least in part the effect of pressure on the valve member, a restriction in the passageway downstream of the valve seat of smaller size than the passageway through the valve seat when the valve is open across which substantially all of the pressure drop across the valve is taken when the valve is open, said valve member and pressure responsive member exposed on all sides to substantially the same upstream pressure when the valve is open to balance out at least in part the effect of pressure on the valve member, and means for reciprocating the valve member toward and away from its seat to open and close the valve, said pressure responsive member being situated between the valve member and the reciprocating means.

3. A valve comprising, a body having a flow passageway therethrough, a side door in the body opening into the passageway, sleeve means insertable through the side door and mounted in the body to form a part of the flow passageway, said sleeve providing a valve seat, a valve member reciprocally mounted in the passageway and cooperable with the seat to control flow through the valve, said sleeve perforated downstream of the valve seat and providing a restriction in the passageway downstream of the valve seat of smaller size than the flow passageway through the seat when the valve is open, a pressure responsive member having an effective area substantially equal to that of the valve member within the valve seat and operably connected to the valve member and situated in the sleeve on the other side of the sleeve perforations from the valve member, conduit means exposing opposite sides of the pressure responsive member to upstream and downstream pressure respectively when the valve is closed, to balance out at least in part the effect of pressure on the valve member, and means for reciprocating the valve member toward and away from its seat to open and close the valve.

4. The valve of claim 3 wherein the seat is provided by a radially extending face on the sleeve and perpendicular thereto, and a seal between the valve seat and valve member is provided by a resilient member which is completely enclosed by the valve seat and member when the valve member is seated and provides a pressure energized seal between the valve member and seat.

5. A valve comprising, a body having a flow passageway therethrough, a side door in the body opening into the passageway, sleeve means insertable through the side door and mounted in the body to form a part of the flow passageway, said sleeve means providing a valve seat, a valve member reciprocally mounted in the passageway and cooperable with the seat to control flow through the valve, said sleeve means being perforated downstream of the valve seat and providing a restriction in the passageway downstream of the valve seat of smaller size than the flow passageway through the seat when the valve is open, a piston mounted for reciprocation in the sleeve means on the other side of the perforations from the valve member, means providing a sliding seal between the piston and sleeve means, means connecting the piston and valve member in spaced relationship, conduit means exposing the piston on its side remote from the valve member to upstream pressure to balance out at least in part the effect of upstream pressure on the valve member, and means for reciprocating the valve member toward and away from its seat to open and close the valve.

6. A valve comprising, a body having a flow passageway therethrough, a side door in the body opening into the passageway, sleeve means insertable through the side door and mounted in the body to form a part of the flow passageway, said sleeve means providing a valve seat, a valve member reciprocally mounted in the passageway and cooperable with the seat to control flow through the valve, said sleeve means perforated downstream of the valve seat and providing a restriction in the passageway downstream of the valve seat of smaller size than the flow passageway through the seat when the valve is open, a piston mounted for reciprocation in the sleeve means on the other side of the perforations from the valve member, means providing a sliding seal between the piston and sleeve means, means connecting the piston and valve member in spaced relationship, conduit means exposing the piston on its side remote from the valve member to upstream pressure to balance out at least in part the effect of upstream pressure on the valve member, a closure in the sleeve, a rod connected to the piston and extending through and having a sliding seal with the closure, the effective pressure area of the piston being substantially equal to the sum of the effective pressure area of the upstream side of the valve member and the cross-sectional area of the rod whereby the effect of pressure is substantially balanced out when the valve is closed and is unbalanced by the cross-sectional area of the rod when the valve is open, and means for reciprocating the valve member toward and away from its seat to open and close the valve.

7. The valve of claim 6 wherein the means for reciprocating the valve member includes a resilient means urging the rod toward valve closing position and a fluid operated diaphragm motor operably connected to the rod to open the valve when the diaphragm is subjected to a control pressure.

8. A three-way valve comprising, a body having a flow passageway therethrough including an inlet and two outlets, in-line valve seats exposed on adjacent sides to the inlet and respectively for controlling flow through both outlets, a three position double acting valve member cooperable with the seats for closing both outlets and selectively opening one of the outlets, said valve member including a cylindrical portion of slightly smaller diameter than the valve seats, means sealing the cylindrical portion to the valve seats when the valve is closed whereby inlet pressure will have little effect on the valve member when the valve is closed, a pressure responsive member connected to the valve member and exposed on opposite sides to pressure in the respective outlets when the valve is closed to balance out at least in part the effect of outlet pressure on the valve member when the valve is closed, and a restriction in at least one of the outlets of smaller size than the passageway through the valve seats across which substantially all of the pressure drop is taken when the valve is open to flow through said one outlet, and means for reciprocating the valve member to selectively close the valve or open the valve to flow through one of the outlets.

9. A three-way valve comprising, a body having a flow passageway therethrough including an inlet and two outlets, in-line valve seats exposed on adjacent sides to the inlet and respectively for controlling flow through both outlets, a three position double acting valve member cooperable with the seat for closing both outlets and selectively opening one of the outlets, said valve member including a cylindrical portion of slightly smaller diameter than the valve seats, means sealing the cylindrical portion to the valve seats when the valve is closed whereby inlet pressure will have little effect on the valve member when the valve is closed, said cylindrical portion having endwise surfaces exposed respectively to pressure in the outlets when the valve is closed, a pressure responsive member connected to the valve member and providing surfaces on opposite sides exposed to pressure in the respective outlets when the valve is closed to balance out at least in part the effect of outlet pressure on the valve member when the valve is closed, and a restriction in at least one of the outlets of smaller size than the passageway through the valve seats across which substantially all of the pressure drop is taken when the valve is open to flow through said one outlet, said surfaces of the valve member and pressure responsive member, which are exposed to downstream pressure in said one outlet when the valve is closed also being exposed to upstream pressure upon opening of the valve to flow through said one outlet to balance out at least in part the effect of upstream pressure on the valve member upon such opening of the valve, and means for reciprocating the valve member to selectively close the valve or open the valve to flow through one of the outlets.

10. A valve comprising, a body having a flow passageway therethrough, a valve seat across the passageway, a valve member reciprocally mounted in the passageway and cooperable with the seat controlling flow through the passageway, a port in line with the valve seat and on the upstream side of the valve seat, said valve member including a cylindrical portion of slightly smaller diameter than the valve seat and port and extending through said seat and port when the valve member is closed, said cylindrical portion having an endwise surface exposed to pressure downstream of the valve seat when the valve is closed, means sealing the cylindrical portion to the valve seat and port when the valve is closed whereby inlet pressure will have little effect on the valve member when the valve is closed, a pressure responsive member connected to the valve member and having a surface on one side exposed to pressure downstream of the valve seat, to balance out at least in part the effect of downstream pressure on the valve member, a restriction in the passageway downstream of the valve seat and pressure responsive member of smaller size than the passageway through the valve seat when the valve is open across which substantially all of the pressure drop across the valve is taken, said surfaces of the valve member and pressure responsive member which are exposed to downstream pressure when the valve is closed also being exposed to upstream pressure upon opening of the valve to balance out at least in part the effect of such upstream pressure on the valve member, and means reciprocating the valve member toward and away from its seat to open and close the valve.

11. A valve comprising, a body having a flow passageway therethrough, a valve seat across the passageway, a valve member reciprocally mounted in the passageway and cooperable with the seat controlling flow through the passageway, a port in line with the valve seat and on the upstream side of the valve seat, said valve member including a cylindrical portion of slightly smaller diameter than the valve seat and port and extending through said seat and port when the valve member is closed, means sealing the cylindrical portion to the valve seat and port when the valve is closed whereby inlet pressure will have little effect on the valve member when the valve is closed, said cylindrical portion having an endwise surface exposed to pressure downstream of the valve seat when the valve is closed, a pressure responsive member connected to the valve member and having a surface on one side exposed to pressure downstream of the valve seat, to balance out at least in part the effect of downstream pressure on the valve member, the end of the valve member extending through the port and the other side of the pressure responsive member being exposed to the same pressure to balance out at least in part the effect of said last mentioned pressure on the valve member, a restriction in the passageway downstream of the valve seat and pressure responsive member of smaller size than the passageway through the valve seat when the valve is open across which substantially all of the pressure drop across the valve is taken, said surfaces of the valve member and pressure responsive member which are exposed to downstream pressure when the valve is closed being exposed to upstream pressure upon opening of the valve to balance out at least in part the effect of upstream pressure on the valve member, and means reciprocating the valve member toward and away from its seat to open and close the valve.

References Cited in the file of this patent
UNITED STATES PATENTS

| | | |
|---|---|---|
| 560,550 | Smith | May 19, 1896 |
| 1,111,244 | Wilson | Sept. 22, 1914 |
| 1,525,426 | Mueller et al. | Feb. 3, 1925 |
| 1,772,406 | Whiton | Aug. 5, 1930 |
| 2,797,061 | Buchanan | June 25, 1957 |